United States Patent [19]

Soussloff

[11] Patent Number: 4,600,334
[45] Date of Patent: Jul. 15, 1986

[54] MOUNTING DEVICE WITHOUT AXIAL MOTION

[75] Inventor: Dimitri G. Soussloff, Wyomissing, Pa.

[73] Assignee: Fenner America Inc., Manheim, Pa.

[21] Appl. No.: 736,681

[22] Filed: May 22, 1985

Related U.S. Application Data

[63] Continuation-in-part of Ser. No. 594,950, Mar. 20, 1984, Pat. No. 4,543,704.

[51] Int. Cl.⁴ .............................................. F16B 2/14
[52] U.S. Cl. .................................. 403/369; 242/72.1
[58] Field of Search ............... 403/370, 371, 374, 16, 403/369; 242/72.1

[56] References Cited

U.S. PATENT DOCUMENTS

| | | | |
|---|---|---|---|
| 738,445 | 9/1903 | Hoffmann | 403/371 X |
| 967,334 | 8/1910 | Curry et al. | 242/72.1 |
| 1,024,344 | 4/1912 | Langerin | 403/370 |
| 1,739,740 | 12/1929 | Stoeltzlen | 403/370 X |
| 3,614,140 | 8/1969 | Nestor | 403/370 X |
| 4,079,896 | 3/1978 | Plach | 242/68.2 |
| 4,202,644 | 5/1980 | Soussloff | 403/369 |
| 4,268,185 | 5/1981 | Mullenberg | 403/16 |

FOREIGN PATENT DOCUMENTS

| | | | |
|---|---|---|---|
| 45618 | 9/1919 | Sweden | 403/371 |
| 1369236 | 10/1974 | United Kingdom | 403/369 |

Primary Examiner—Andrew V. Kundrat
Attorney, Agent, or Firm—Dann, Dorfman, Herrell and Skillman

[57] ABSTRACT

A mounting device for anchoring a machine element coaxially on a rotary shaft. The device fits between the interior cylindrical bore of the machine element and the internal cylindrical surface of the shaft and is effective to position the element at any desired position longitudinally of the shaft and at any angular position circumferentially of the shaft. The device has first and second segmented sleeves. The second sleeve has separate internal and external parts so as to afford expansion and contraction of the external part by wedging the internal part of the second sleeve between the external part and the first sleeve, allowing the device to clamp the element on the shaft at any desired position during tightening. The internal surface of the internal part of the second sleeve and the external surface of the first sleeve are similarly tapered so that relative axial displacement of the first and second sleeves effects expansion and contraction of both the interior bore and the external circumference of the combined elements.

14 Claims, 9 Drawing Figures

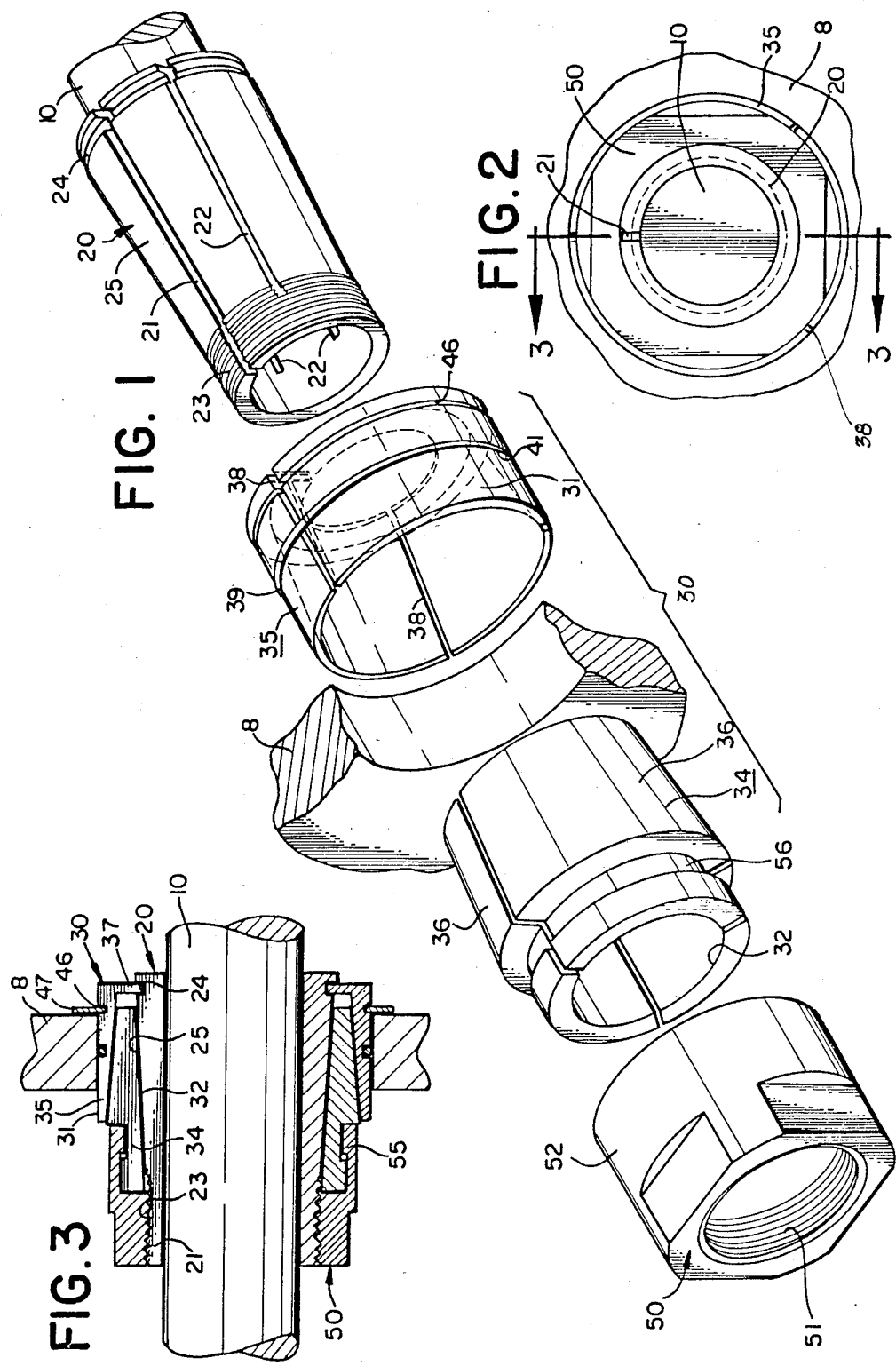

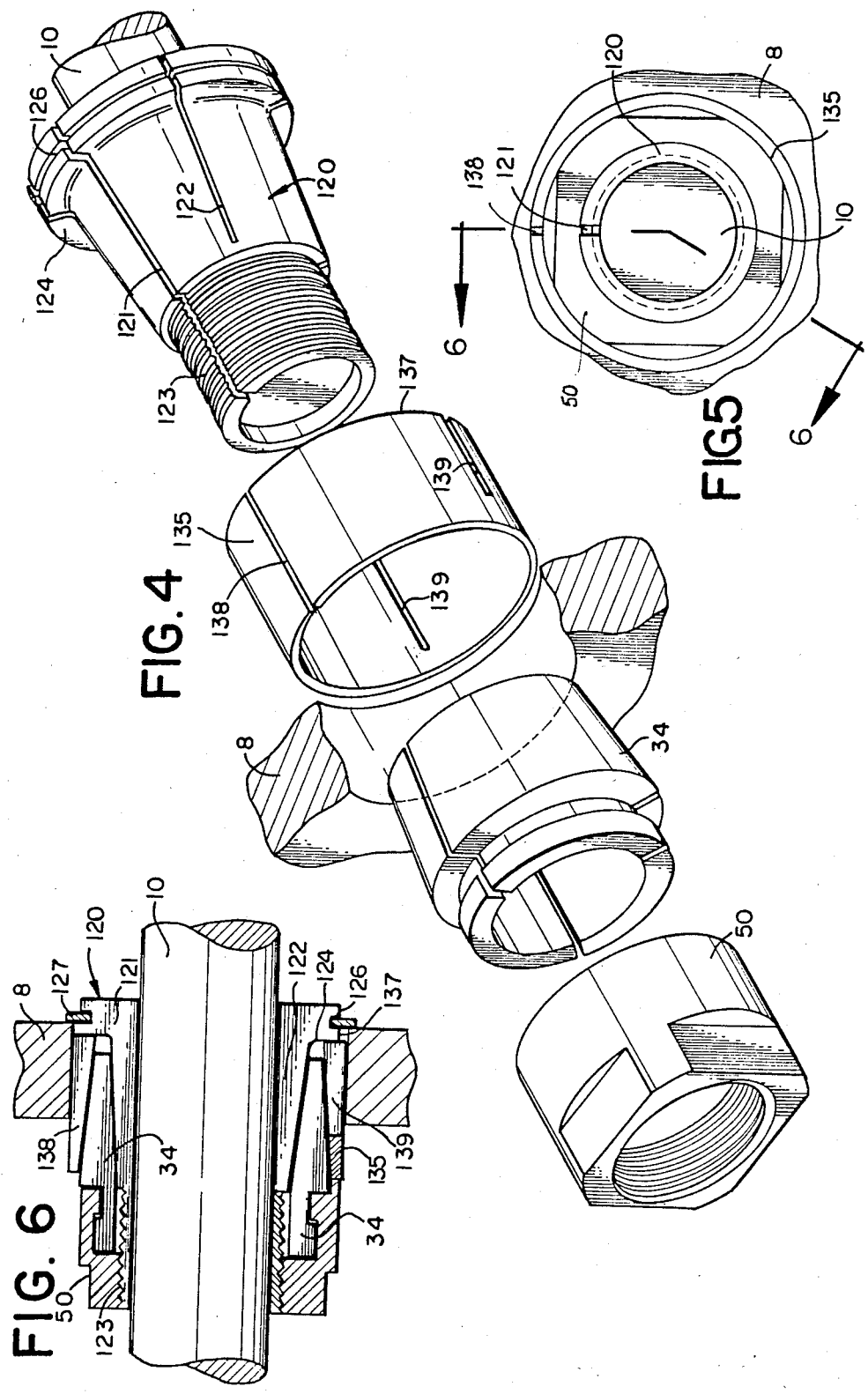

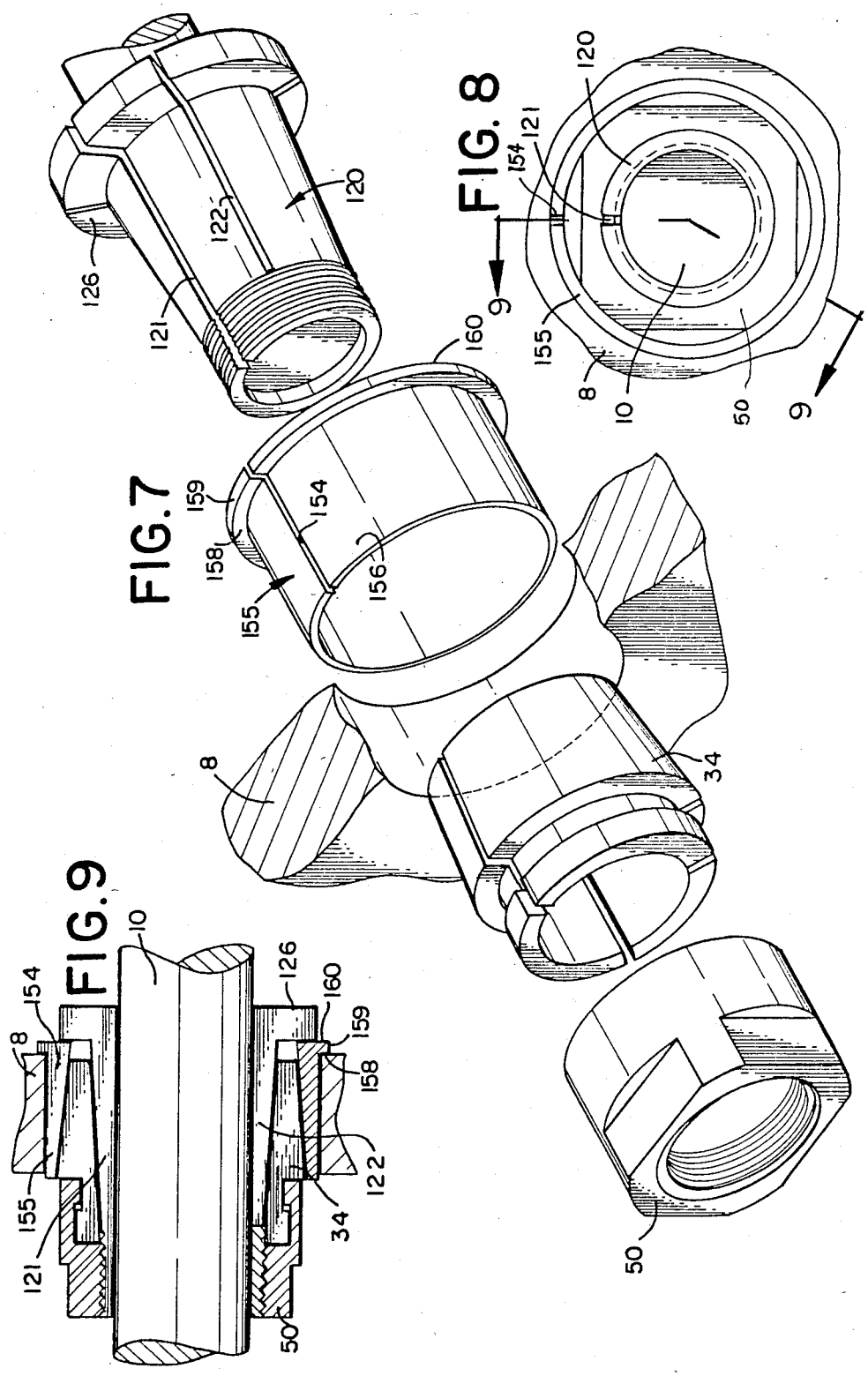

MOUNTING DEVICE WITHOUT AXIAL MOTION

RELATED APPLICATIONS

The present application is a continuation-in-part of U.S. patent application Ser. No. 594,950 filed Mar. 20, 1984 (now U.S. Pat. No. 4,543,704) which included subject matter common to U.S. patent application Ser. No. 923,056 filed July 10, 1978 and now issued as U.S. Pat. No. 4,202,644 dated May 13, 1980.

FIELD OF THE INVENTION

The present invention relates to a device for mounting a machine element upon a shaft. In particular, the device of the present invention is a device which is capable of mounting a machine element at a precise position on the shaft without danger of axial movement during the mounting operation.

BACKGROUND OF THE INVENTION

The device of U.S. Pat. No. 4,202,644 overcomes the deficiencies of standard mounting techniques which either involved a complicated mounting mechanism or else required a high degree of skill and competence to assure proper mounting of a machine element on a shaft. The present invention enables a machine element to be mounted on a shaft in a precise position and yet affords adjustment of the position by simple and effective adjustment of the mounting device itself without need for modifying the shaft or the machine element.

In the device of U.S. Pat. No. 4,202,644, the machine element mounted on the device moves axially relative to the shaft during the tightening operation, and prior attempts to overcome this drawback have reduced the ability of the mounting device to properly position the machine element on the shaft.

SUMMARY OF THE INVENTION

With the foregoing in mind, the present invention provides a novel mounting device which operates on the principle of U.S. Pat. No. 4,202,644, but is effective to assure precise positioning of the machine element on the shaft during adjustment and tightening of the device.

More specifically the present invention provides a mounting device having an inner sleeve and a two-part second sleeve, the two-part outer sleeve providing an outer component part which remains axially fixed relative to the inner first sleeve during the tightening and preferably also during loosening of the device and an inner part which serves as a wedge between the outer part of the second sleeve and the inner sleeve.

All of the objects of the invention are more fully set forth hereinafter with reference to the accompanying drawings.

DESCRIPTION OF THE DRAWINGS

FIG. 1 is a fragmentary exploded perspective view of a mounting device embodying the present invention;

FIG. 2 is an end view of the device as seen from the left hand end in FIG. 1 after assembly;

FIG. 3 is a transverse sectional view taken on the section line 3—3 of FIG. 2;

FIG. 4 is a fragmentary exploded perspective view similar to FIG. 1 showing an alternate embodiment of the invention;

FIG. 5 is a left hand end view of the assembled device;

FIG. 6 is a sectional view taken on the line 6—6 of FIG. 5;

FIG. 7 is an exploded perspective view of a third embodiment of the present invention;

FIG. 8 is an end view of the assembled device as seen from the left in FIG. 7; and FIG. 9 is a sectional view taken on the line 9—9 of FIG. 8.

DETAILED DESCRIPTION OF THE PREFERRED EMBODIMENTS OF THE INVENTION

Referring to the preferred embodiment illustrated in FIGS. 1-3, the device shown therein is adapted to mount a machine element 8 on a cylindrical shaft 10. The machine element 8 has a straight cylindrical bore so that it may be adjusted circumferentially and axially to any desired position relative to the straight cylindrical shaft 10. The mounting device of the present invention serves to anchor the machine element 8 at the proper desired position relative to the shaft 10.

As shown assembled in FIG. 3, the mounting device comprises an inner first sleeve 20 which encircles the shaft 10. The element 20 comprises an integral member having a straight cylindrical interior bore adapted to mate with the cylindrical surface of the shaft 10. The first sleeve element 20 is segmented and includes a single through-slot 21 and a plurality of terminated slots 22 which extend from one end of the sleeve to a position short of the other end so that the inner sleeve 20 remains as a single integral piece. At the other end, the element 20 is provided with external threads 23 and at the one end, the element 20 is provided with an outwardly-facing circumferential groove 24 which extends completely around the element 10. Between the inner end of the threads 23 and the circumferential groove 24 the outer surface is provided with an expanding taper 25. It has been found that a 3° taper is a desirable angle. The plurality of interrupted slots 22 extending from the inward end of the element 20 enable the element 20 to be compressed to cause the internal bore to contract and firmly anchor the element 20 on the shaft 10 at any desired position axially and circumferentially of the shaft.

In accordance with the present invention, cooperating with the inner sleeve 20, a two-part second sleeve 30 is provided which comprises two parts, an interior first segmented wedge part 34 on the inside and an exterior second segmented part 35 circumscribing the wedge part 34. The exterior surface 31 of the part 35 of the sleeve 30 is a straight cylindrical surface whereas the interior surface 32 of the wedge part 34 of the second sleeve is tapered as indicated at 32 to mate with the tapered surface 25 of the first sleeve. The interior wedge part 34 of the two-part sleeve 30 comprises a wedge element which is adapted to be driven along the tapered surfaces 32 and 25 in one direction to forceably expand and in the other direction to afford contraction of the exterior part 35 of the second sleeve member. The interior part 34 comprises a plurality, in the present instance three, separate segments 36 having the inner and the outer surfaces tapered in opposite directions to provide wedge-like segments adapted to be positioned between the first sleeve 20 and the exterior part 35 of the second sleeve 30.

In accordance with the present invention, the interior part 34 of the sleeve 30 is displaced relative to the first sleeve 20, and means is provided to anchor the exterior part 35 of the second sleeve axially relative to the first sleeve 20 so that displacement of the inner part of the second sleeve relative to the first sleeve 20 also displaces the inner part 34 of the second sleeve relative to its outer part 35. To this end, as shown in FIG. 3, the outer part 35 extends beyond the smaller end of the part 34 and terminates in an inwardly directed abutment flange 37 which engages in the groove 24 of the first sleeve 20. To afford engagement and disengagement of the flange 37 in the groove 24, the exterior element 35 is split, in the present instance in three places indicated at 38. As shown, the slits 38 extend throughout the entire axial length of the element 35, and to maintain these elements assembled, a resilient ring, for example an O-ring 39 circumscribes the assembly and is seated in a central circumferential groove 41 in the exterior surface 31 of the second sleeve 30. The resilient retaining element 39 affords resilient expansion and contraction of the outer exterior part 35 when the interior part 34 is displaced relative thereto. As shown, the interior surface of the exterior part 35 and the exterior surface of the interior part 34 are complementary tapered in a direction opposite to the direction of taper of the surfaces 32 and 25. Thus as the interior part 34 of the second sleeve is displaced axially between the first sleeve 20 and the exterior part 35 of the second sleeve, the second part will expand or contract by the wedging action provided by the tapered surfaces.

In a manner similar to the device shown in U.S. Pat. No. 4,202,644, the interior part of the second sleeve is driven by a nut 50 having internal threads 51 engaging the threads 23 of the first sleeve 20. The nut 50 has a hollow drive portion 52 which surrounds and interlocks with the one end of the interior part 34 of the second sleeve. Rotating the nut on the threads displaces the nut axially and also displaces the interior part 34 axially. An interlock is provided between the nut 50 and the interior part 34. In the present instance, the interlock is provided by an inwardly directed flange 55 (see FIG. 3) which engages in an outwardly directed groove 56 which has a width slightly greater than the width of the flange to afford an interlock which permits relative rotation therebetween. The flange and groove provide forward and rearward abutting surfaces so that when the nut is tightened on the first sleeve 20, the forward surfaces engage to cause the nut to drive the wedge inwardly between the first sleeve 20 and the exterior part 35 of the second sleeve 30. Loosening the nut 50, on the other hand, causes the rearward surfaces of the flange and groove to abut and drives the wedge segments outwardly from between the element 20 and the exterior part 35 of the second sleeve 30, permitting the O-ring 39 to cause the segments of the exterior part to contract. These forward and rearward radial surfaces thereby provide forceful engagement and disengagement of the wedge parts between the inner sleeve 20 and the exterior part of the second sleeve 30.

Although it is preferred that the outwardly facing groove 56 be provided on the inner element 34 and the inwardly directed flange be on the nut 50, thereby insuring a positive interlock between the elements, the outwardly facing groove may be positioned on the outer surface of the nut and an inwardly directed flange may be provided on the inner surface of the interior member of the second sleeve so that the interior member circumscribes the nut rather than the nut circumscribing the interior member. This reversal of parts will not have a substantial adverse affect on the ability of the mounting device to maintain its integrity when displaced from the shaft since the retaining element 39 is effective to maintain the various parts assembled, even when they are displaced from the shaft 10 and the machine element 8.

In order to facilitate proper positioning of the machine element on the shaft, a positioning guide is provided to engage the machine element and afford a proper axial position of the machine element relative to the shaft. To this end, the outer part 35 of the second sleeve is provided with a circumferential groove 46 adjacent to the flange 37. A retaining ring 47, or an E-clip if desired, is mounted in the circumferential groove 46 to circumscribe the exterior part 35 and provide a positioning guide for the element 8. The element 47 preferably is sufficiently resilient so that it does not interfere with the expansion and contraction of the exterior part 35 as the interior part 34 operates to wedge itself inwardly and outwardly between the exterior part 35 and the first sleeve 20.

Thus the device of FIG. 1 is effective to permit proper positioning of the machine element on the shaft without likelihood of disturbing the adjustment as the mounting device is tightened. It should be noted that the interconnection between the inner piece 20 and the exterior part 35 provided by the abutment flange 37 and groove 24 maintains a precise axial relationship between these two parts and the positioning guide member 47 provides the proper axial relationship between the machine element 8 and the exterior part 35. Thus, before tightening the nut 50 to effect clamping engagement of the mounting device on the shaft, the element 8 may be adjusted axially on the shaft to the precise desired axial position. When at that position, the nut may be tightened and tightening the nut does not exert any axial pressure on either the first sleeve 20 or the exterior part 35 of the second sleeve 30. Since there is no axial pressure on either of these elements, there is no tendency for the machine element to move axially as the nut 50 is tightened on the threads 23.

An alternate embodiment is shown in FIGS. 4–6. In this embodiment of the invention, the machine element 8 and the shaft 10 are shown to be the same as in FIGS. 1–3. The first sleeve is modified as shown at 120 and the two-part second sleeve is modified in the exterior part as shown at 135, the interior part 34 of the two-part sleeve being the same as in FIGS. 1–3 and also the nut 50. In this embodiment of the invention, the first sleeve 120 has a single through-slot 121 and a plurality of terminated slots 122. The first sleeve terminates at the outer end in external threads 123 and terminates at the inner end in an outwardly directed flange 124 having a circumferential groove 126 in the outwardly facing surface of the flange 124. A retaining ring or E-clip 127 (see FIG. 6) is mounted in the groove 126 to serve as a positioning guide element similar to the element 47 of the first embodiment. The flange 124 has an outer diameter less than the interior diameter of the machine element 8, but greater than the interior diameter of the exterior part 135 of the second sleeve so that the outer extremity of the flange 124 provides an abutment against which the end surface 137 of the exterior part 135 may abut to limit the axial displacement of the part 135 relative to the sleeve 120. By using a separable positioning guide 127, it can be removed to permit the inner sleeve to pass through the bore of the element 8.

If this facility is not desired, the flange 24 may be extended radially outward so that the flange itself serves as a positioning guide for the element 8.

The part 135, in the present instance, is provided with a single through-slot 138 and a plurality of terminated slots 139 which cooperate to provide for expansion and contraction of the part 135 without interfering with the integrity of the part so that it serves to encircle the segments of the interior part 34 and maintain them assembled when it is positioned in circumscribing relationship to the interior part 34. The material of the part 135 positioned between the ends of the terminated slots 139 and the outer edge of the part 135 provides a plurality of bridges which permit the segments formed between the slots 139 and the through-slot 138 to expand and contract. As with the part 35, the exterior surface of the part 135 is straight cylindrical surface whereas the interior surface is tapered complementary to the tapered surface of the interior part 34. The converging inner and outer surfaces of the interior part 34, when driven between the elements 120 and 135 not only expands the part 135 radially but also provides an axial force component urging the end 137 of the part 135 against the abutment wall provided by the flange 124 so as to avoid any tendency of the exterior part 135 to be displaced axially away from the flange 124 as the mounting device is tightened on the shaft 10.

In operation the embodiment of FIGS. 4–6 is similar to that of FIGS. 1–3, inasmuch as the mounting device is assembled on the shaft 10 and within the machine element 8 and the machine element is then positioned at the precise axial location where it is desired. The positioning guide element 127 assures that the axial position of the element 8 is fixed relative to the first sleeve 120 so that the position of the sleeve 120 on the shaft accurately determines the axial position of the element 8 relative to the shaft. As with the previously-described embodiment, the tightening of the nut on the element 120 does not impart any axial forces tending to displace the element 120 axially and the positioning of the exterior part 135 between the machine element 8 and the wedge segments of the interior part 34 isolates the machine element 8 from any axial forces which might tend to cause axial movement of the machine element from its proper axial position. Thus the present embodiment provides a mounting device with no axial motion which affords precise axial positioning of a machine element relative to the shaft.

FIGS. 7 through 9 illustrate a third embodiment of the invention which is appropriate for mounting a machine element on a shaft which is not subject to the rigorous mechanical requirements for which the previously-described embodiments are designed.

This embodiment is similar to the embodiment of FIGS. 4–6 in that it utilizes the same inner element 120, but the peripheral groove on the exterior surface of the flange 126 is eliminated as being unnecessary. The two-part sleeve of this embodiment utilizes the same interior part 34 to cooperate with the same nut 50 as in the previously-described embodiments.

In this embodiment the exterior part of the two-part sleeve is shown at 155 and comprises a bushing having a straight cylindrical outer surface 156 throughout the major portion of its length and a tapered interior surface complementary to the tapered exterior surface on the interior part 34. At the inner end of the exterior surface 156, a shoulder 158 is provided separating the cylindrical surface 156 from the terminal enlarged toe portion 159 to form a positioning guide for the machine element 8. The end wall 160 of the exterior part 155 is adapted to abut against the flange 126, as in the embodiment of FIGS. 4–6, and the machine element 8 is positioned on the bushing 155 by engaging the guide shoulder 159. The exterior bushing part 155 is provided with a single through-slot 154, and the material of the element 155 is sufficiently resilient to permit the element to expand or contract upon advance and retraction of the wedge part 34 between the part 155 and the inner sleeve 120.

Thus, the third embodiment of the invention provides means for locating the machine element 8 at a precise axial position on the shaft 10, and means to avoid axial movement when the mounting device is being tightened.

While different embodiments of the present invention have been herein illustrated and described, the invention is not limited to the particular embodiments illustrated, but changes and modifications may be made therein and thereto within the scope of the following claims.

I claim:

1. A mounting device for mounting a machine element having a cylindrical bore coaxially on a shaft having a cylindrical surface, said device comprising a segmented inner first sleeve encircling the shaft and comprising an integral member having a straight cylindrical interior bore corresponding in diameter to the external cylindrical surface of said shaft and having a tapered external surface and external threads at one end thereof, a two-part second sleeve encircling said inner sleeve, the interior part of said second sleeve comprising a wedge having a tapered internal surface corresponding in angle of taper to the tapered external surface of said first sleeve, the exterior part of said second sleeve circumscribing said interior part and having a straight cylindrical outer surface corresponding in diameter to the cylindrical bore of said machine element, and a clamping nut threadedly engaged with the threaded end of said inner sleeve, the segments of said inner first sleeve providing a plurality of terminated axial slots extending longitudinally of said inner sleeve, each extending from one of the ends of the inner sleeve and terminating short of the other of the ends, and a single axial through-slot extending from end to end of the inner sleeve to permit contraction and expansion of said interior bore without disturbing the integrity of said member, the interior part of said second sleeve comprising a plurality of separate separable segments circumscribed by said exterior part, said exterior part being expandable and contractable and extending axially beyond said interior part remote from said clamping nut and having abutment means engaging said first sleeve to limit axial displacement of said exterior part of said second sleeve relative to said first sleeve, said interior part of said second sleeve having circumferential interlock means providing opposed forward and rearward radial surfaces substantially perpendicular to the central axis of said shaft, said clamping nut having cooperating circumferential interlock means defining opposed forward and rearward drive surfaces confronting the corresponding surfaces of the interlock means of said interior part, whereby upon rotation of said nut in one direction, the forward surfaces of the respective interlock means engage and effect axial displacement of said interior wedge part in one direction relative to both said first sleeve and said exterior part, and upon rotation of said nut in the opposite direction, the rearward surfaces of the respective interlock means engage and effect relative axial displacement of said interior wedge part in the opposite direction relative to both said first sleeve and said exterior part, said displacements causing said tapered surfaces to afford radial expansion and to contract the interior bore of the inner first sleeve and to afford radial contraction and to expand the exterior part of said second sleeve.

2. A mounting device according to claim 1 including positioning guide means extending circumferentially of said mounting device and projecting outwardly beyond the outer cylindrical surface of the exterior part of the second sleeve, said guide means adapted to engage the machine element to determine the axial position of the element relative to said shaft.

3. A mounting device according to claim 2 wherein said positioning guide means comprises a retaining device, and said outer cylindrical surface is circumferentially grooved to receive said retaining device.

4. A mounting device according to claim 2 wherein said positioning guide means comprises a retaining device, and said first sleeve has a circumferential groove mounting said device beyond the end of said exterior part.

5. A mounting device according to claim 2 wherein said outer cylindrical surface of said exterior part terminates at one end in a shoulder projecting outwardly therefrom to form said positioning guide means.

6. A mounting device according to claim 1 wherein said exterior part of said second sleeve comprises a tubular member having axial slit means therealong and operable to resiliently retain said exterior part assembled in circumscribing relation to said interior segmented part of the second sleeve.

7. A mounting device according to claim 6 wherein said axial slit means comprises a plurality of slits extending throughout the length of said exterior part to form separate segments, and said second sleeve includes a resilient ring encircling said segments of said exterior part to resiliently retain them assembled, said segments having a circumferential groove in said cylindrical surface to house said ring.

8. A mounting device according to claim 6 wherein said axial slit means comprises a single axial slit extending throughout the length of said exterior part and a plurality of axial slits extending from one end of the part and terminating short of the other end to provide a bridge between adjacent segments formed by said slits, said bridges cooperating to resiliently retain said segments assembled.

9. A mounting device according to claim 6 wherein said exterior part is formed of resilient material and said slit means comprises a single axial slit extending throughout the length of said exterior part, the resilient material of said part retaining said part assembled around said interior part.

10. A mounting device according to claim 1 wherein the outer surface of said interior part and the inner surface of said exterior part are tapered in a direction opposite to the tapered surfaces between said interior part and said first sleeve.

11. A mounting device according to claim 1 wherein said abutment means comprises an inwardly directed flange extending around said exterior part of the second sleeve, said first sleeve having a circumferential groove at its end opposite said threaded end, said flange of said exterior part of said second sleeve adapted to engage in the groove of said first sleeve to limit axial displacement of said exterior part relative to said first sleeve.

12. A mounting device according to claim 11 wherein said exterior part has an outwardly-directed circumferential groove adjacent said inwardly directed flange, and including a retaining device mounted in said outwardly directed groove to serve as means for positioning said machine element on said exterior part.

13. A mounting device according to claim 1 wherein said abutment means comprises a flange on said inner first sleeve projecting radially outward beyond the interior surface of said exterior part, the end of said exterior part adapted to abut said flange to limit axial displacement of said exterior part relative to said first sleeve.

14. A mounting device according to claim 13 wherein said inner sleeve flange has an outwardly-directed circumferential groove, and including a retaining device mounted in said groove to serve as guide means for positioning said machine element relative to said shaft.

* * * * *